July 25, 1961 W. H. BRAND 2,993,498
POSITIONING DEVICE

Filed March 27, 1958 2 Sheets-Sheet 1

INVENTOR.
Warren H. Brand,
BY Paul & Paul
ATTORNEYS.

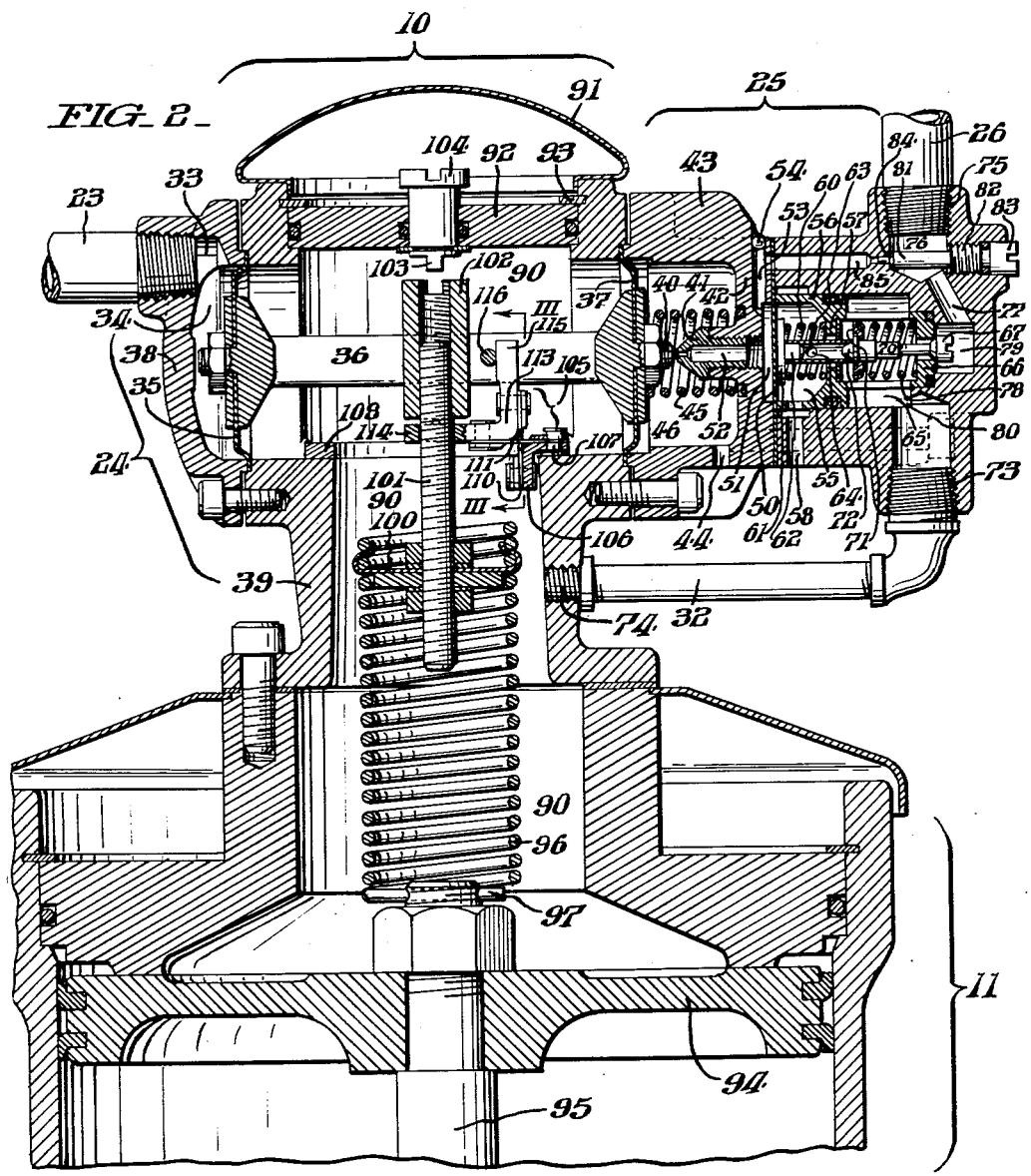

United States Patent Office 2,993,498
Patented July 25, 1961

2,993,498
POSITIONING DEVICE
Warren H. Brand, Blue Bell, Pa., assignor to Conoflow Corporation, Philadelphia, Pa., a corporation of Pennsylvania
Filed Mar. 27, 1958, Ser. No. 724,481
22 Claims. (Cl. 137—85)

This invention relates to a device in the field of instrumentation for positioning and controlling a movable member, and more specifically relates to an automatic device for positioning a fluid operated or other actuator.

For many years the process industries have utilized controllers of various forms for regulating the operation of controlling devices, such as pneumatic valves, for example, in response to variations of process conditions. Such process conditions may involve temperature, pressure, concentration of solutions, or any of a wide variety of other conditions which are subject to change as conditions vary in a wide variety of processes.

It is an object of this invention to provide an automatic positioning device which is readily adaptable for use in processes of the kind above referred to, and which is much more versatile in its operation than the devices heretofore available.

It is an object of this invention to provide a position controlling device which is extremely sensitive in its response to minute variations of a process condition.

Another object of this invention is to provide a positioner having a responsive action which varies almost precisely linearly with the variation of the process condition under control.

Another object of this invention is to provide a position controller which may readily be modified in the field, for service either as a direct acting or reverse acting controller, without requiring any major disassembly or reassembly of parts.

Another object of this invention is to provide a positioner for a pressure fluid actuator having a fluid cushion operable upon its control element, wherein the operation of the fluid cushion may readily be interchanged with the operation of the controlling pressure such that the direction of operation of these factors may readily be reversed in the field.

Other objects and advantages of this invention include the provision of a positioner which is capable of operating at temperatures as low as minus 65° F. and below, and as high as 250° F. and above.

Still another object is the provision of a positioner having easy zero adjustment, and continuous zero suppression and span adjustment.

Another object of this invention is to provide a fluid actuated positioner having a sealed load chamber construction which is readily adaptable for connection such that it is fail-safe in its operation.

Another object and advantage of this invention resides in the provision of a fluid actuated positioner which mechanically amplifies a signal input emanating from the variable which is subject to control, in a manner to put into operation corrective forces which are of a much greater magnitude than the variations of the input signal.

Other objects of this invention include the provision of a fluid actuated positioning controller having a minimum of moving parts, wherein the moving parts are completely encased and protected against the effects of dust and corrosion and accordingly are useable in a wide variety of conditions and environments.

Other objects and advantages of this invention will further become apparent hereinafter, and in the drawings of which:

FIG. 2 is an enlarged sectional vertical elevation showing a specific form of a position controlling device in accordance with this invention;

Figure 1:
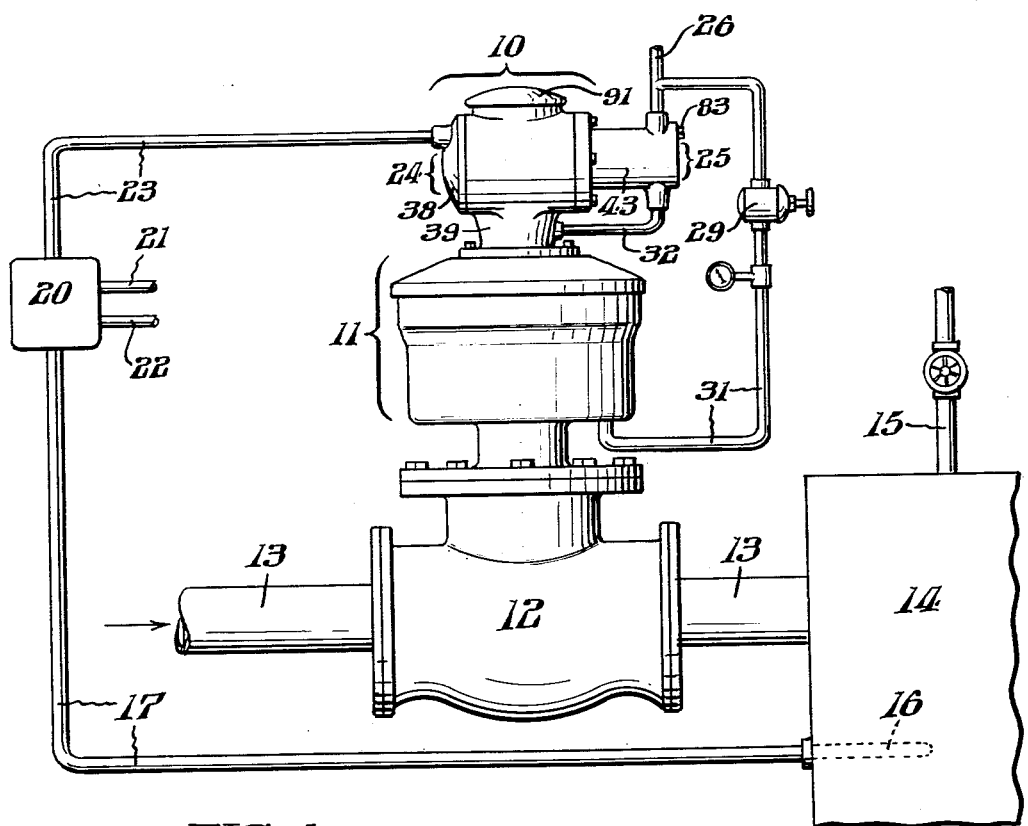
FIG. 1 is a diagrammatic view in side elevation showing a positioner in accordance with this invention, as connected to an apparatus performing a process which is subject to control.

Turning now to the specific form of the invention shown in the drawings, FIG. 1 shows the general arrangement of a positioning device 10 connected to a fluid operated actuator 11 which is mounted on a valve 12 arranged to control the rate of flow of fluid in a pipe 13 flowing into a container 14.

As one specific example of the invention, it may be assumed that a heating medium is fed at a constant rate through a pipe 15 and that the temperature of the contents of container 14 rises or falls in response to changes in the rate of flow of fluid through the pipe 13.

The number 16 designates a temperature sensing device operating through a connection 17 to impose a signal pressure on a controller 20. The controller 20 is any suitable self-actuated, indicating or blind controller in accordance with usual instrumentation practice. It is provided, as shown, with a connection 21 for fluid supply pressure, a connection 22 for fluid set pressure (pressure of a determined and constant amount), and also has an output pressure line 23 for fluid under controlled pressure, such line leading into the positioner 10 to actuate such positioner in accordance with the variations of temperature at the sensing device 16.

As appears in FIG. 1, the controlled pressure line 23 feeds into a main body 24, which is connected to a pilot valve 25, the important details of which will be discussed more specifically hereinafter. FIG. 1 shows that a fluid supply line 26 is connected into the pilot valve 25. Extending from the fluid supply line 26, is a cushion pressure line 31 having a regulator 29 and connected to one end of the actuator 11 to provide a constant cushion pressure operable in one direction. A pressure line 32 extends from pilot valve 25 to the other end of the actuator 11 to operate it in the opposite direction.

Referring now to the specific form of the main body 24, pilot valve 25 and actuator 11 as shown in FIG. 2 of the drawings, the controlled pressure line 23 communicates through an opening 33 formed in an input chamber cover 38 into an input chamber 34 provided with a pressure sealed diaphragm 35 which is attached at its center to one end of a yoke 36. Yoke 36 is connected at its other end to a diaphragm 37 also sealed to the main body 24. The input chamber cover 38 is removable connected and sealed to the body portion 39 of the main body 24.

The diaphragm 37, on the pilot valve side of the main body 24, carries a flapper valve member 40 arranged to reciprocate toward and away from a nozzle 41 threaded into a dividing wall fixed to the casing 43 of the pilot valve 25. Wall 42 and diaphragm 37 cooperate to form a chamber 46. The casing 43 has a large diameter vent opening 44 directly communicating with the atmosphere. A helical spring 45, normally under compression, extends in chamber 46 from the yoke 36 to the wall 42, normally urging the valve member 40 away from the nozzle 41. Spring 45 is not required, in several modes of application of the device, but is used in others.

The casing 43 of the pilot valve 25 is removably connected and sealed to the body portion 39 of the main body 24 at a position opposite to that of the input chamber cover 38. This is an important and advantageous feature of the invention, as will further become apparent hereinafter.

Extending across the casing 43, at a location axially spaced from the diaphragm 37, is a diaphragm 50 forming a chamber 51 which is in fluid communication with the bore 52 of nozzle 41 and also with a radially extending passage 53 which has a ball-type seal 54 sealing passage 53 from the atmosphere.

Diaphragm 50 also forms, on its opposite face, a chamber 55 having an exhaust vent 58. Located in chamber 55 is a fixed cylinder 56 having an inwardly extending flange 57 against which one end of an axially arranged helical compression spring 60 bears. The other end of spring 60 bears upon a disc 61 on the diaphragm 50. Disc 61 carries a pin 62 extending into the end of an axially arranged tube 63 extending freely through the central opening in the flange 57. Tube 63 has a hole 64 providing for pressure communication between the chamber 55 and the bore of the tube 63.

Adjacent the chamber 55 is a chamber 65 in which is housed a transversely arranged valve seat 66 coacting with a valve 67 having an axially extending valve stem 70. At its opposite end the stem 70 carries a disc 71 and a nose piece 72 extending into and seating upon the corresponding end of tube 63. A helical compression spring 78 bears upon the disc 71 and upon the shoulder of valve seat 66, normally urging the nose piece 72 toward the end of tube 63.

The chamber 65 is connected, by way of opening 73, into pipe 32 which leads to an opening 74 in the body portion 39.

The pilot valve 25 has an opening 75 into which the fluid supply pipe 26 is connected. The fluid supply reaches the valve 67 by way of passages 76, 77 and chamber 79. When valve 67 is open, such pressure flows through the valve, through passage 80 and opening 73 into pipe 32.

Arranged across the passage 76 is a pressure reducing valve having a stem 81 having a threaded portion 82 and an exposed notched head 83 accessible for ready adjustment. A valve seat 84 cooperating with the valve 81 communicates with a passage 85 formed adjacent the edge of the pilot valve body, such passage communicating with the passage 53 extending to the chamber 51, the diaphragm 50 being cut away in the region of the passage 85. The valve 81, 84 reduces the pressure of the incoming fluid critically maintaining constant flow.

Accordingly, it will be apparent that, when the yoke 36 moves toward the right as viewed in FIG. 2, the nozzle 41 is constricted by valve member 40, increasing the pressure in chamber 51, shifting the center of diaphragm 50 and tube 63 to the right, opening valve 67 and supplying fluid under pressure to the pipe 32. Movement of yoke 36 in the opposite direction increases the rate of bleeding of fluid out through the nozzle 41 and opening 44, reducing the pressure in chamber 51, permitting spring 60 to push tube 63 to the left, and permitting spring 78 to shift the valve stem 70 to the left, maintaining a closing relation between nose piece 72 and the end of tube 63. This action moves valve 67 toward a closed position, decreasing the rate at which fluid is supplied to the pipe 32.

As appears in FIG. 2, variations of pressure of the fluid introduced through line 32 are imposed upon a closed chamber 90 formed in the upper central and body portion 39 of main body 24, and in the upper portion of the fluid operated actuator 11. This pressure is exerted equally and oppositely on the diaphragms 35, 37 and its variations produce no movement of yoke 36 in either direction.

It will further be apparent that the upper end of the main body 24 is sealed, and is provided with removable cap 91 and a sealed closure disc 92 held in position by a snap ring 93.

At the lower end of the chamber 90, the pressure fluid confined therein bears upon the surface of a piston 94 connected to a shaft 95, the movement of which is controlled in accordance with this invention. The shaft 95 is for example, a valve stem connected to the valve gate of the valve 12 shown in FIG. 1. The constant cushion pressure from line 31, FIG. 1, bears upon the bottom surface of piston 94, and acts in opposition to the pressure in chamber 90.

At the end of the shaft 95, the end 97 of a helical range spring 96 extends through a corresponding bore in the shaft 95. The range spring 96 extends along the chamber 90, substantially coaxially with the shaft 95, and at substantially right angles to the yoke 36.

A disc 100 is arranged and adjustably affixed transversely of the range spring 96. Disc 100 is adjustable along the length of range spring 96, changing the number of working coils, thereby giving continuous span adjustment. Disc 100 is threadedly connected to an elongated threaded rod 101 carrying an enlarged, threaded sleeve 102 at a location spaced from the range spring 96. The sleeve 102 is adjustable in position along the threaded rod 101, and is notched at its end to correspond to the key portion 103 of a zero adjusting piece 104 carried on the sealed closure disc 92.

Fixed within the body portion 39, in the chamber 90, and coacting with the threaded sleeve 102, is a flexure strip structure 105. This structure comprises an angle iron 106 secured at 107 to a ring 108 on the body portion 39, to which is secured a flexure strip 110 normally substantially parallel to the axis of range spring 96, and another flexure strip 111 normally substantially perpendicular to flexure strip 110. The flexure strips are cut away to slightly less than about one-half their width at the location of their intersection, providing clearance between the flexure strips as indicated at 112 in FIG. 3.

Flexure strips 110, 111 are secured respectively to the legs of another angle iron 113, one leg 114 of which is provided with an opening through which the threaded rod 101 extends, and the other leg 115 extending to a location adjacent an elongated pin 116 carried by the yoke 36.

Figure 3:
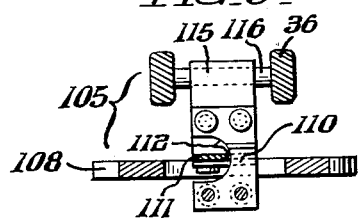
FIG. 3 is an enlarged sectional view of a flexure strip, comprising a part of the position controlling device of FIG. 2, taken as indicated by the lines and arrows III—III which appear in FIG. 2.

In operation, the apparatus shown in FIGS. 1–3 automatically governs the desired movements of the shaft 95 in response to variations of the signal received from the temperature sensing device 16, or any other variable. Assuming a change of the variable causes an increase of fluid pressure at pipe 23, yoke 36 shifts to the right as viewed in FIG. 2, causing the pressure in pipe 32 to be increased by the action of pilot valve 25, in the manner heretofore described. Such pressure increase, operative in the chamber 90, causes a downward displacement of the piston 94 and shaft 95. However, as this downward displacement continues, the range spring 96 is extended, and this pulls the threaded rod 101 downwardly such that the threaded sleeve 102 contacts the leg 114 of the flexure strip structure 105. This causes leg 114 to move downwardly, and leg 115 to move toward the left, pushing the pin 116 toward the left. This causes yoke 36 to move toward the left, in opposition to the pressure in the chamber 34, drawing valve member 40 away from nozzle 41, reducing the pressure in chamber 51, and moving the valve 67 toward its closed position under the influence of its spring 78. This reduces the fluid supply to pipe 32, and stops the increase of pressure in chamber 90 in relation to the constant cushioning pressure from line 31, acting in opposition to the pressure in chamber 90. This, in turn, stops the downward movement of the shaft 95.

Accordingly, in response to a change of pressure at line 23, due to a change of the variable under control, the apparatus moves the controlled member 95 through a slight increment and shuts itself off, awaiting a further signal so that it can again control the movement of the member 95 in the proper direction and in an appropriate amount.

When the pressure from controlled pressure line 23 decreases, the range spring 96 and the spring 45, acting in conjunction, shift yoke 36 to the left, opening valve 40, reducing the pressure in chamber 51, and spring 78 moves valve 67 toward its closed position. This reduces the pressure in chamber 90, and the cushion pressure from line 31 shifts the piston 94 and shaft 95 upwardly, relaxing range spring 96 and permitting flexure strip structure 105 to return to its relaxed position. The movement of yoke 36 toward the left is stopped when the pressure in chamber 34 balances the force of spring 96.

The valve comprising tube 63 and nose piece 72 is provided such that, when pressure in chamber 51 is low, and valve 67 closed, the spring 60 overbalances such pressure, pushing tube 63 to the left. Since valve 67 is stopped against its seat, nose piece 72 cannot move to the left, and the end of tube 63 is separated from it, exhausting pressure fluid out of chamber 90 through pipe 32, chamber 65, tube 63, hole 64, chamber 55 and exhaust vent 58. Piston 94 moves slightly upwardly as a result of this exhausting operation, relaxing range spring 96, permitting yoke 36 to shift to the right, increasing the pressure in chamber 51, and thus closing the valve formed by tube 63 and nose piece 72.

The arrangement just described provides dynamic operation in that, even with the device in a static condition, air or other fluid leaks slowly past control valve 67, and the pressure in chamber 90 may become increased due to such leakage, causing piston 94 to be shifted down, even though the pressure in line 23 remained constant. This structure overcomes this effect by bleeding out pressure fluid, just as described in connection with the normal exhausting operation.

Figure 4:
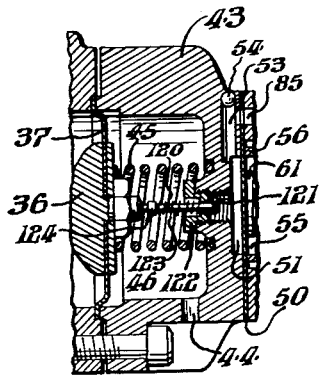
FIG. 4 is an enlarged view in vertical section showing a modified form of valve arrangement which may be substituted for the valve arrangement in the pilot valve shown in FIG. 2.

FIG. 4 shows a modified form of the invention, in which the valve acts in reverse as compared to FIG. 2. The valve stem 120 has a contact with the end of yoke 36 and has a valve end 121 cooperating with a seat 122 threaded into the casing 43. The seat 122 is located between the valve end 121 and the diaphragm 37. A spring 123, under compression and bearing upon a sleeve 124 on stem 120, normally urges the valve toward its closed position. A stop means, not shown, is provided for limiting the movement of valve end 121 in its opening direction, to protect the diaphragm 37 from damage due to too great an excursion. As will be apparent, the reverse acting valve of FIG. 4 is readily interchangeable with the direct acting valve of FIG. 2.

Although the positioner in accordance with this invention is preferably operated by air, other fluids, either liquid or gaseous, may be substituted. The device may be connected to control variables of many different types other than the temperature variable referred to in the drawings and in the foregoing description. It may control the position of any movable element, and is not restricted in its scope to the control of a valve.

Moreover, it will readily be appreciated that the position controller in accordance with this invention is not limited in its application to the control of a piston 94 and valve 95 as heretofore described, but may readily be connected to control any suitable fluid operated actuator, or even other actuators which may be connected to move in response to the movement produced by variations of pressure such as may be obtained from a line such as line 32. Moreover, chamber 90 may be vented to atmosphere or operated at a variable or constant pressure, depending upon the manner in which pipe 32 is connected to actuate the movement of the movable member, as long as the range spring 96 has applied to it the proper restoring force.

It will be appreciated that the pilot valve 25 and the input chamber cover 38 are readily interchangeable, reversing the operation of the positioner, and if desired the line 32 may be a flexible tube. Also, line 32 may be connected below and line 31 above the piston 94, to convert from a top loading to a bottom loading arrangement. All such modifications may readily be made independently of one another.

It is desirable (though not essential) to regulate the cushion pressure such that it produces a force of about one-half the maximum force produced by the load pressure. Thus, the cushion force, when the load pressure exerts zero force, is about equal to the resultant force exerted by maximum load pressure, as opposed by the cushion force. This may be achieved either by regulation of pressure, by applying such forces to unequal areas on piston 94, or by various other means.

Although the valve stem 95 has been shown as attached directly to the piston 94, any motion transmitting linkage may be substituted, for local or remote control of the position of this or any other movable member.

Although this invention has been described in connection with a specific embodiment thereof, reference having been made to certain modifications, it will be appreciated that various modifications may be made, including the substitution of equivalent elements for those specifically shown and described, reversals of parts, and the use of certain features without the use of other features, all without departing from the spirit and scope of the invention as defined in the appended claims.

Having thus described my invention, I claim:

1. In an apparatus for controlling the movement of a movable member in response to a variable, the combination comprising means forming a chamber including a pair of aligned and opposed flexible sealing diaphragms, of equal size and shape, means external of said chamber for exerting on one of said flexible diaphragms a pressure varying with said variable, rigid means in said chamber connecting said flexible diaphragms for movement in unison, fluid pressure actuating means connected to move said movable member, a pilot valve connected to the other of said flexible sealing members and to said fluid pressure actuating means, and a mechanical connection, including a resilient linkage extending along an axis substantially perpendicular to that of said rigid means, for connecting said movable member to said rigid means for controlling the displacement axially of said rigid means in response to movement of said movable member to stop said movement.

2. In an apparatus for controlling the movement of a movable valve stem in response to a variable, the combination comprising means forming a chamber including a pair of aligned and opposed flexible sealing diaphragms of equal size and shape, pressure means including a cover external of said chamber for exerting on one of said flexible diaphragms a pressure varying with said variable, rigid yoke means in said chamber connecting said flexible members for reciprocating movement in unison with one another, a piston mounted for reciprocation in said chamber and connected to said valve stem to control the movement thereof, a pilot valve connected to and actuated from the other of said flexible sealing members, means for transmitting pressure to said pilot valve, and from said pilot valve to said chamber, and a mechanical connection, including a resilient linkage extending along an axis substantially perpendicular to that of said rigid yoke means, for connecting said piston to said rigid yoke means for controlling the axial repositioning of said rigid yoke means in response to movement of said piston.

3. In an apparatus for controlling the movement of a movable member in response to a variable, the combination comprising means forming an enclosed pressure chamber including a pair of opposed flexible sealing members, means external of said chamber for exerting on the outside of one of said flexible members a pressure which varies with said variable, rigid means in said chamber connecting said flexible members for reciprocating movement in unison with one another, fluid pressure actuating means connected to move said movable member, valve means operably connected to control said fluid pressure to said actuating means, said valve means being connected to and actuated from the other of said flexible sealing members, and a mechanical connection including a resilient linkage extending along an axis substantially perpendicular to that of said rigid means, for connecting said movable member to said rigid means for controlling the displacement axially of said rigid means in response to movement of said movable member to stop said movement.

4. In an apparatus for controlling the movement of a movable member in response to a variable, the combination comprising means forming an enclosed pressure chamber including a pair of opposed flexible sealing members, means external of said chamber for exerting on the outside of one of said flexible members a pressure which varies with said variable, a rigid yoke in said chamber connecting said flexible members for movement in unison, fluid pressure actuating means connected to move said movable member, fluid control means operably connected to control said fluid pressure to said actuating means, said fluid control means being connected to and actuated from the other of said flexible sealing members, and a mechanical connection, including a resilient linkage extending along an axis substantially perpendicular to that of said yoke, for connecting said movable member to said yoke for controlling the axial position of said yoke in response to movement of said movable member in opposition to said pressure exerted on the outside of said flexible member.

5. A positioning device for positioning a movable member in response to a variable input signal, comprising means forming a chamber for fluid under pressure, actuating means movable in response to variation of said pressure in said chamber and mechanically connected to said movable member to actuate the movement thereof, a pair of opposed diaphragms sealed to said chamber, a yoke extending across said chamber rigidly connecting said diaphragms, means forming a closed space outside said chamber communicating pressure to one of said diaphragms, a pilot valve outside said other diaphragm including valve means for applying a variable pressure to said chamber to operate said actuating means, a range spring located within said chamber connected to stretch and contract in response to movement of said actuating means, and a mechanical linkage extending from said range spring to said yoke to re-position said yoke when said range spring is deflected.

6. The positioning device defined in claim 5, wherein said mechanical linkage includes a flexure strip coacting with a protuberance on said yoke, said flexure strip including a rockable member which swings toward and away from said protuberance.

7. The positioning device defined in claim 6, wherein said range spring is arranged at substantially right angles to said yoke and carries a threaded rod having an enlargement thereon movable into and out of contact with a portion of said flexure strip, swinging said flexure strip toward and away from said protuberance.

8. In a positioner, means forming a chamber having a pair of spaced, opposed diaphragms, a rigid member extending across said chamber connecting said diaphragms for movement back and forth jointly with one another, an angle piece in said chamber having a pair of rigidly connected legs arranged at angles to one another, a pair of resilient flexure strips each affixed within said chamber and each connected to one of said legs, thereby supporting said angle piece in a determined position while permitting rocking movement thereof, one of said legs being arranged to contact said rigid member, an elongated rod connected to the other leg, movable means actuated by the pressure in said chamber and movable in accordance therewith, and means connecting said movable means to said elongated rod.

9. The positioner defined in claim 8, wherein the elongated rod extends freely through said other leg, and has an enlargement thereon arranged to contact said leg when said rod is moved in one direction but not the other.

10. In a positioner, means forming a chamber having a pair of spaced, opposed diaphragms, a rigid member extending across said chamber connecting said diaphragms for movement back and forth jointly with one another, a movable member sealed to said chamber and reciprocable along a path essentially at right angles to the movement of said rigid member, a flexure strip structure including a pair of rigidly connected legs arranged essentially at right angles to one another, one of said legs being disposed to move toward and away from, and into and out of contact with said rigid member, an elongated threaded rod connected to the other leg, a pair of spring metal flexure strips arranged essentially at right angles to one another and affixed respectively to the aforementioned legs, said flexure strips also being affixed at their opposite ends to the interior of said chamber, and an elongated range spring connecting said movable member to said elongated threaded rod.

11. The positioner defined in claim 10, wherein the elongated threaded rod extends freely through said other leg, and has an enlargement thereon arranged to contact said leg when said rod is moved in one direction but not the other.

12. The positioner defined in claim 11, wherein said enlargement is a sleeve threadedly adjustable along said rod, said sleeve having a notch at its free end, and wherein an externally accessible rotatable adjusting member extends into said chamber for engagement within said notch.

13. In a positioner, means forming a chamber having a pair of spaced, opposed diaphragms, a rigid member extending across said chamber connecting said diaphragms for movement back and forth jointly with one another, a movable member sealed to said chamber and reciprocable along a path essentially at right angles to the movement of said rigid member, a flexure strip structure including a pair of rigidly connected legs arranged at angles to one another and resiliently rockable on flexure strips disposed within said chamber, one of said legs being arranged to swing back and forth into and out of contact with said rigid member, an elongated threaded rod connected to the other leg, and an elongated helical range spring extending essentially at right angles to the path of movement of said rigid member and connecting said movable member to said elongated threaded rod.

14. The positioner defined in claim 13, wherein the elongated threaded rod extends freely through said other leg, and has an enlargement adjustably positioned thereon arranged to reciprocate into and out of contact with said other leg.

15. A position controlling device for controlling a movable element comprising means forming a chamber, chamber diaphragm means sealed to said chamber, said movable element being subjected to and movable in response to variation of pressure within said chamber, means for shifting said diaphragm means in response to an input signal, a pilot valve externally attached to said chamber and having a vented exhaust valve element attached for movement with said diaphragm, a sealed operating chamber communicating with said exhaust valve and exhausting therethrough, means feeding fluid at substantially constant flow into said operating chamber, an operating chamber diaphragm communicating with said operating chamber and movable in response to pressure fluctuations therein, an operating valve operable by said operating chamber diaphragm and connected to provide fluid under controlled variable pressure to actuate said movable member, and motion transmitting means within said first-named chamber in contact with said diaphragm shifting means and movable in response to shifting movement of said piston for selectively actuating said instrument chamber diaphrgam, said motion transmitting means including an elongated helical spring, an elastically rockable flexure strip structure, means extending from said spring in contact with said flexure strip structure, and means on said diaphragm shifting means disposed in the path of movement of a portion of said flexure strip structure.

16. The device defined in claim 15, wherein said flexure strip structure comprises an angle iron secured to the body of said chamber, a pair of flexure strips each connected at one end to one of the legs of said angle iron, said flexure strips being arranged at approximately right angles to one another and having accommodating sections cut out at the location of their intersection, and each flexure strip being attached at its other end to a leg to another angle iron spaced from the first mentioned angle iron.

17. In an apparatus for controlling the movement of a movable member in response to a variable, the combination comprising means forming a chamber including a pair of aligned and opposed flexible sealing diaphragms, of equal size and shape, means external of said chamber for exerting on one of said flexible diaphragms a pressure varying with said variable, rigid means in said chamber connecting said flexible diaphragms for movement in unison back and forth along a predetermined axis, a pilot valve including a shiftable member mounted coaxially with said predetermined axis, said pilot valve being connected to the other of said flexible sealing members, fluid pressure actuating means connected from said pilot valve to move said movable member, and means including a stretchable linkage extending from said movable member along an axis substantially perpendicular to said predetermined axis, for contacting said rigid means to control its axial position on said predetermined axis to counteract said varying pressure.

18. In an apparatus for controlling the movement of a movable member in response to a variable, the combination comprising means forming a chamber including a pair of pressure-balanced flexible sealing diaphragms having substantially equal effective areas, means external of said chamber for exerting on one of said flexible diaphragms a pressure varying with said variable, rigid means extending between and connecting said flexible diaphragms for movement in unison, fluid pressure actuating means connected to move said movable member, valve means connected to the other of said flexible sealing members and to said fluid pressure actuating means, and a mechanical connection, including a resilient linkage extending along an axis substantially perpendicular to that of said rigid means, for connecting said movable member to said rigid means for controlling the positioning axially of said rigid means in response to movement of said movable member to stop said movement.

19. In a fluid pressure controlled actuator positioner; a chamber having axially-aligned opposed diaphragms of substantially equal surface area sealing said chamber; a rigid member within said chamber connecting said diaphragms; control means external of said chamber for exerting a control fluid pressure on the external surface of one of said diaphragms for effecting an initial displacement of said rigid member along its axis; an actuator-positioning piston in said chamber movable along an axis substantially perpendicular to that of said rigid member; pilot valve means coupled to the external surface of the other of said diaphragms and responsive to movement thereof in a direction coaxial with the axis of said rigid member for controlling the application of a supply fluid pressure for controlling the position of said piston; mechanical means including resilient means having an axis coaxial with that of said piston and perpendicular to that of said rigid member, for connecting said piston to said rigid member such that the reaction force of said resilient means along said perpendicular axis effects the repositioning of said initially displaced rigid member on its own axis.

20. Apparatus as claimed in claim 19 characterized in that said rigid member includes a lateral projection and in that said mechanical means includes an angle member having one leg at substantial right angle to the other, said one leg being connected to said resilient means and said other being arranged to be in contact with said lateral projection on said rigid member.

21. Apparatus as claimed in claim 20 further characterized in that said one leg is connected to said resilient means by a threaded rod adjustable in length.

22. In a fluid pressure controlled actuator positioner; a chamber having axially-aligned opposed diaphragms of substantially equal surface area sealing said chamber; a rigid member within said chamber connecting said diaphragms; control means external of said chamber for exerting a control fluid pressure on the external surface of one of said diaphragms for effecting an initial displacement of said rigid member along its axis; pilot valve means coupled to the external surface of the other of said diaphragms and responsive to movement thereof in a direction coaxial with the axis of said rigid member for controlling the application to said chamber of a supply fluid pressure; an actuator-positioning piston in said chamber movable along an axis substantially perpendicular to that of said rigid member; mechanical means, including resilient means having an axis coaxial with that of said piston and perpendicular to that of said rigid member, for connecting said piston to said rigid member such that the reaction force of said resilient means along said perpendicular axis effects the repositioning of said initially displaced rigid member on its own axis.

References Cited in the file of this patent

UNITED STATES PATENTS

| | | |
|---|---|---|
| 2,276,505 | Moore | Mar. 17, 1942 |
| 2,575,085 | Alyea | Nov. 13, 1951 |
| 2,584,455 | Hughes | Feb. 5, 1952 |
| 2,649,714 | Griffith | Aug. 25, 1953 |
| 2,667,860 | Henderson et al. | Feb. 2, 1954 |
| 2,817,318 | Mackenzie et al. | Dec. 24, 1957 |